United States Patent
Nürnberg et al.

(10) Patent No.: US 12,415,114 B2
(45) Date of Patent: Sep. 16, 2025

(54) SPORTS BALLS

(71) Applicant: adidas AG, Herzogenaurach (DE)

(72) Inventors: Hans-Peter Nürnberg, Gutenstetten (DE); Daniel Stephen Price, Herzogenaurach (DE); Henry Niles Hanson, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 42 days.

(21) Appl. No.: 17/078,459

(22) Filed: Oct. 23, 2020

(65) Prior Publication Data

US 2021/0038947 A1 Feb. 11, 2021

Related U.S. Application Data

(63) Continuation of application No. 15/167,054, filed on May 27, 2016, now Pat. No. 10,850,165.

(30) Foreign Application Priority Data

May 28, 2015 (DE) ...................... 10 2015 209 811.7

(51) Int. Cl.
*A63B 37/04* (2006.01)
*A63B 39/00* (2006.01)
(Continued)

(52) U.S. Cl.
CPC .............. *A63B 37/04* (2013.01); *A63B 43/00* (2013.01); *A63B 45/00* (2013.01);
(Continued)

(58) Field of Classification Search
CPC ..... A63B 43/00; A63B 37/0098; A63B 39/00; A63B 2243/0025; A63B 2039/003; A63B 2043/001; A63B 43/002; A63B 41/00
See application file for complete search history.

(56) References Cited

U.S. PATENT DOCUMENTS 1,667,088 A * 4/1928 Turner ................. A63B 41/085
473/599
1,678,830 A * 7/1928 Scudder ............... A63B 41/085
473/599
(Continued)

FOREIGN PATENT DOCUMENTS

CN 100389840 C 5/2008
DE 10 2004 045 176 A1 3/2006
(Continued)

OTHER PUBLICATIONS

Definition of "opening" from google search. Retrieved on Mar. 13, 2020. (Year: 2020).
(Continued)

*Primary Examiner* — Steven B Wong
(74) *Attorney, Agent, or Firm* — Sterne, Kessler, Goldstein & Fox P.L.L.C.

(57) ABSTRACT

The present invention relates to sports balls. A sports ball comprises a surface layer comprising a plurality of panels. The sports ball further comprises a lattice structure extending below the surface layer, wherein the lattice structure comprises a plurality of lattice cells comprising radially extending elements. The lattice cells which are adjacent to the surface layer have at least one dimension which is smaller than an average diameter of the panels.

17 Claims, 14 Drawing Sheets

(51) Int. Cl.
*A63B 43/00* (2006.01)
*A63B 45/00* (2006.01)
A63B 37/00 (2006.01)
A63B 43/06 (2006.01)
A63B 67/14 (2006.01)
A63B 102/02 (2015.01)

(52) U.S. Cl.
CPC ........... *A63B 37/0098* (2013.01); *A63B 39/00* (2013.01); *A63B 2039/003* (2013.01); *A63B 43/06* (2013.01); *A63B 67/14* (2013.01); *A63B 2102/02* (2015.10); *A63B 2243/0025* (2013.01); *A63B 2243/0033* (2013.01); *A63B 2243/0095* (2013.01)

(56) References Cited

U.S. PATENT DOCUMENTS

| | | | | |
|---|---|---|---|---|
| 1,853,008 A * | 4/1932 | Turner | A63B 41/04 | 473/603 |
| 2,131,756 A * | 10/1938 | Roberts | A63B 39/00 | 473/605 |
| 2,210,954 A * | 8/1940 | Roberts | B29D 22/04 | 156/213 |
| 2,294,424 A | 9/1942 | Roberts | | |
| 2,307,182 A * | 1/1943 | Young | A63B 37/0097 | 473/355 |
| 2,352,872 A | 7/1944 | Voit et al. | | |
| 2,399,324 A | 4/1946 | Clark | | |
| 3,256,019 A * | 6/1966 | Barton | A63B 41/00 | 156/170 |
| 3,288,469 A * | 11/1966 | Shaw | A63B 37/0083 | 473/280 |
| 3,413,243 A | 11/1968 | Griffin | | |
| 3,889,950 A | 6/1975 | Kasravi | | |
| 3,908,994 A * | 9/1975 | Astrom | A63B 43/00 | 473/613 |
| 4,577,867 A | 3/1986 | Lenhart | | |
| 4,610,071 A * | 9/1986 | Miller | A63B 37/00 | 29/458 |
| 4,653,752 A * | 3/1987 | Miller | B29C 44/18 | 156/292 |
| 4,660,830 A * | 4/1987 | Tomar | A63B 45/00 | 264/161 |
| 4,660,831 A | 4/1987 | Kralik | | |
| 4,995,613 A * | 2/1991 | Walker | A63B 69/3655 | 264/319 |
| 5,007,639 A * | 4/1991 | Watson | A63B 37/02 | 273/DIG. 20 |
| 5,181,717 A * | 1/1993 | Donntag | A63B 41/08 | 273/DIG. 8 |
| 5,224,959 A | 7/1993 | Kasper | | |
| 5,236,196 A | 8/1993 | Blankenburg et al. | | |
| 5,306,001 A * | 4/1994 | Shishido | A63B 41/00 | 473/604 |
| 5,730,287 A * | 3/1998 | Martin | A63B 47/00 | 206/315.9 |
| 5,865,697 A * | 2/1999 | Molitor | A63B 41/00 | 473/604 |
| 5,882,567 A * | 3/1999 | Cavallaro | B29C 43/146 | 264/273 |
| 6,012,997 A * | 1/2000 | Mason | A63B 43/00 | 273/DIG. 20 |
| 6,045,454 A * | 4/2000 | Chu | A63B 69/3655 | 473/368 |
| 6,261,400 B1 * | 7/2001 | Kennedy, III | A63B 45/00 | 264/516 |
| 6,267,695 B1 * | 7/2001 | Masutani | A63B 37/0004 | 473/378 |
| 6,290,615 B1 | 9/2001 | Ogg | | |
| 6,302,815 B1 * | 10/2001 | Shishido | A63B 41/08 | 473/604 |
| 6,379,270 B2 * | 4/2002 | Maruko | A63B 37/0003 | 473/378 |
| 6,398,667 B1 | 6/2002 | Lemons | | |
| 6,398,677 B1 * | 6/2002 | Hergert | A63B 41/08 | 224/919 |
| 6,422,960 B1 * | 7/2002 | Touhey | A63B 41/12 | 473/593 |
| 6,572,499 B2 * | 6/2003 | Davies | A63B 43/04 | 473/594 |
| 6,688,998 B2 * | 2/2004 | Hergert | A63B 41/08 | 473/603 |
| 6,746,351 B1 * | 6/2004 | Goodman | A63B 39/00 | 473/612 |
| 8,585,851 B1 | 11/2013 | Kennedy, III | | |
| 8,622,857 B2 * | 1/2014 | Lo | A63B 41/04 | 473/612 |
| 8,652,602 B1 | 2/2014 | Dolla | | |
| 8,852,039 B2 * | 10/2014 | White | B29C 66/81427 | 473/604 |
| 8,877,110 B2 | 11/2014 | Molinari | | |
| 8,900,077 B2 * | 12/2014 | Ou | B29C 35/0227 | 473/604 |
| 9,205,310 B1 * | 12/2015 | Hampton | A63B 39/00 | |
| 9,586,098 B1 * | 3/2017 | Ahsan | A63B 45/00 | |
| 10,029,155 B1 * | 7/2018 | Lo | A63B 41/02 | |
| 10,376,749 B2 * | 8/2019 | Campbell | A63B 43/008 | |
| 10,549,159 B2 * | 2/2020 | Simonutti | A63B 39/00 | |
| 2002/0010037 A1 * | 1/2002 | Nesbitt | A63B 37/00621 | 473/371 |
| 2003/0228946 A1 * | 12/2003 | Chan | A63B 41/00 | 473/604 |
| 2004/0213984 A1 * | 10/2004 | Avis | A63B 41/08 | 428/72 |
| 2005/0176532 A1 * | 8/2005 | Thorington | A63B 43/04 | 473/595 |
| 2006/0068951 A1 * | 3/2006 | Chang | B29D 22/02 | 473/605 |
| 2006/0084536 A1 * | 4/2006 | Taniguchi | A63B 41/00 | 473/605 |
| 2006/0293132 A1 * | 12/2006 | Laliberty | A63B 41/00 | 473/603 |
| 2007/0161440 A1 * | 7/2007 | Chang | A63B 41/02 | 473/603 |
| 2008/0032834 A1 * | 2/2008 | Krysiak | A63B 41/08 | 473/597 |
| 2008/0099994 A1 * | 5/2008 | Tuttle | A63F 7/00 | 273/280 |
| 2008/0242458 A1 | 10/2008 | Winn | | |
| 2009/0011878 A1 | 1/2009 | Ou | | |
| 2009/0137350 A1 * | 5/2009 | Lenig | A63B 39/00 | 434/247 |
| 2009/0170645 A1 | 7/2009 | Silvergate | | |
| 2009/0325746 A1 | 12/2009 | Raynak et al. | | |
| 2009/0325747 A1 | 12/2009 | Ou | | |
| 2010/0137081 A1 | 6/2010 | Ito et al. | | |
| 2010/0167850 A1 | 7/2010 | Lin | | |
| 2011/0015011 A1 | 1/2011 | Chou | | |
| 2011/0177895 A1 * | 7/2011 | Lin | A63B 41/02 | 473/605 |
| 2011/0214616 A1 | 9/2011 | Levin et al. | | |
| 2011/0218065 A1 * | 9/2011 | Cavallaro | A63B 41/00 | 473/603 |
| 2011/0282452 A1 | 11/2011 | Koerner et al. | | |
| 2012/0088614 A1 * | 4/2012 | Bulfin | A63B 41/08 | 156/220 |
| 2012/0108372 A1 * | 5/2012 | Parenti | A63B 45/00 | 29/899.1 |
| 2012/0172160 A1 | 7/2012 | Marc | | |
| 2013/0161876 A1 * | 6/2013 | Molinari | A63B 45/00 | 264/516 |
| 2014/0179468 A1 | 6/2014 | Berggren et al. | | |
| 2014/0274504 A1 * | 9/2014 | Hu | A63B 37/06 | 473/604 |
| 2015/0375055 A1 * | 12/2015 | Shigemitsu | A63B 37/0044 | 473/376 |
| 2016/0030813 A1 * | 2/2016 | Pinto | A63B 41/10 | 473/606 |

(56) References Cited

U.S. PATENT DOCUMENTS

| | | | |
|---|---|---|---|
| 2016/0096078 A1 | 4/2016 | Sullivan et al. | |
| 2016/0107047 A1 | 4/2016 | Canobbio | |
| 2016/0184656 A1* | 6/2016 | Shigemitsu | A63B 37/0092 |
| | | | 473/376 |
| 2017/0291076 A1 | 10/2017 | Campbell | |
| 2017/0354850 A1* | 12/2017 | Chen | A63B 43/002 |

FOREIGN PATENT DOCUMENTS

| | | | |
|---|---|---|---|
| EP | 2 397196 A2 | 12/2011 | |
| EP | 2 649 896 A2 | 10/2013 | |
| GB | 2 370 995 A | 7/2002 | |
| GB | 2 494 131 A | 3/2013 | |
| JP | H9-299513 A | 11/1997 | |
| JP | H11-89971 A | 4/1999 | |
| SE | 200400675 A * | 9/2004 | A63B 37/14 |

OTHER PUBLICATIONS

Definition of "homogeneous" from google search. Retrieved on Mar. 13, 2020. (Year: 2020).

* cited by examiner

SPORTS BALLS

CROSS-REFERENCE TO RELATED APPLICATION

This application is a continuation of commonly owned U.S. patent application Ser. No. 15/167,054, filed May 27, 2016, which is incorporated herein by reference in its entirety.

BACKGROUND OF THE INVENTION

Field of the Invention

The present invention relates to sports balls, such as soccer balls.

Background Art

Sports balls for which consistent bouncing and/or rebound properties are desired are often filled with pressurized air. However, during use, such balls necessarily lose pressure over time. An example for such sports balls are tennis balls, as disclosed, for example, in U.S. Pat. Nos. 2,131,756 and 2,294,424. When their internal pressure drops below a certain limit, tennis balls are typically simply disposed of. The lifetime of tennis balls is therefore rather limited.

Many other sports balls, such as soccer balls, basketballs, handballs, volleyballs, etc., are generally known to comprise an inflatable bladder. When inflated up to a certain pressure range, the inflatable bladder provides the ball with desired bouncing, rebound, or cushioning properties such that the ball may be conveniently kicked, dribbled, etc. After a possible loss of pressure, the balls may be re-inflated. Therefore, these balls may be used over longer periods of time. Examples of inflatable balls are disclosed in GB 2 494 131 A and DE 10 2004 045 176 A1.

However, re-inflating a ball takes time and is inconvenient. Moreover, the valves required for re-inflating impart a certain imbalance to the ball such that it is very difficult to perfectly balance such balls. Moreover, apart from the general risk of leakages or punctures, there is the additional risk that the valve may break such that the pressure drops and/or the ball cannot be re-inflated anymore.

An airless soccer ball became known under the name "CTRUS" which comprises various plastics and electronics elements. Moreover, attempts have been made to provide a soccer ball by growing pig bladder cells onto a scaffold provided by 3D printing. Further, attempts have been made to pad bladders of soccer balls with foam particles in order to provide the balls with specific bouncing properties. However, such foam particles tend to accumulate asymmetrically within the bladder leading to imbalance and non-uniform bouncing and rebound properties.

These attempts have failed to provide a high-performance sports ball with consistent bouncing and rebound properties that may challenge those of regular sports balls having an inflatable bladder. Hence, it may be considered as an object of the present invention to provide improved sports balls, such as soccer balls, with consistent bouncing and/or rebound properties.

BRIEF SUMMARY OF THE INVENTION

In an embodiment, this problem is at least in part solved by a sports ball comprising (i) a surface layer that comprises a plurality of panels and (ii) a lattice structure extending below the surface layer. The lattice structure comprises a plurality of lattice cells comprising radially extending elements, and at least the lattice cells which are adjacent to the surface layer have at least one dimension which is smaller than an average diameter of the panels. The sports ball may be, for example, a soccer ball.

The above embodiment is based on the general idea of replacing an inflatable bladder and possibly also a carcass of a sports ball by a core structure which provides the ball with homogenous resilience and stability just as an inflatable bladder and carcass such that consistent bouncing and rebound properties as well as stability are provided without the need for (re-)inflating the ball. In other words, the ball may not comprise any bladder and may not be inflatable. Moreover, the ball may not comprise any carcass which is typically provided around the bladder of traditional inflatable balls to protect the bladder (which holds the air) and to provide structure and stiffness.

A homogenous resilience and stability may instead be provided by the lattice structure which has radially extending elements and is thus able to provide resilience and stability particularly in the radial direction. The forces imparted on the ball from outside, e.g., due to kicks, bounces, etc., are imparted on the ball via the lattice cells adjacent to the surface layer. Since these lattice cells comprise sufficiently small dimensions, e.g., smaller than the panels of the ball, homogenous bouncing/rebound/cushioning properties are provided. Given such a small "granularity" of the lattice, the same bouncing properties (e.g., when bouncing off the ground), rebound properties, and feel (e.g., when kicking the ball) are provided by the ball, irrespective of the exact point of contact with the ball. The lattice structure allows achieving an essentially homogeneous and isotropic pressure/force distribution around the entire ball.

Since the lattice structure offers a myriad of design options, the bouncing/rebound properties and the feel of the ball may be tailored as needed, and possibly as desired by the individual customer. As an example, the bouncing and/or rebound properties of soccer balls may be specifically adapted to the needs for indoor soccer (e.g., futsal). Moreover, the lattice structure may be designed in a perfectly rotationally symmetric manner such that a perfectly balanced ball is provided. The small "granularity" of the lattice structure facilitates evenly distributing the lattice structure around the ball which may ensure perfectly homogeneous bouncing/rebound properties and balancing the ball. The lattice structure may optionally be immersed in a fluid, e.g. air at ambient pressure, or any other fluid.

The lattice structure may also be used to engineer the ball's angular momentum of inertia. The weight distribution within the ball may be adapted as needed and is not limited to distributing the ball's mass close to its outer surface as, for example, in traditional soccer balls with inflatable bladders.

An average diameter of a panel may be considered as the mean value of a maximum distance between two opposing ends of the panel and a minimum distance between two opposing ends of the panel. In some examples, at least the lattice cells which are adjacent to the surface layer have at least one dimension which is smaller than a minimum diameter of the panels, e.g., the minimum distance between two opposing ends of the panels. If the ball comprises panels with different geometries, the average and minimum diameter of the panels of the ball may be considered as an average over all panels of the ball The surface layer may be provided from any suitable material. Surface layers known from sports balls, such as soccer balls, may be used. For example, the surface layer may provide the ball with water-resistance, abrasion-resistance, and/or a soft feel, etc. However, the balls according to the present invention may also comprise a surface layer which is produced by an additive manufacturing process, for example by 3D printing. The surface layer may be produced in the same manufacturing process as the lattice structure.

The lattice structure may comprise a set of beam-shaped elements which are connected to each other at their ends. The beams may have any cross-section, e.g., triangular, rectangular, pentagonal, circular and/or elliptical. In other examples, other shapes may be used. A certain number of such elements may form a cell, e.g., a certain number of beam-shaped elements may be arranged to form a tetrahedral cell. In other examples, lattice cells may not be formed by beam-shaped elements. The lattice cells do not need to comprise any sub-structure at all. For example, a lattice cell may be constituted by a spherically-shaped object, wherein the various cells are connected to each other via the surfaces of the spherically-shaped objects. Also other object shapes may be used other than spherical and/or various shapes may be combined to form a cell. For example, such objects may be hollow (e.g., bubbles, etc.) or solid. The objects may have varying sizes. The lattice cells of a lattice structure may be arranged in an ordered manner (e.g., cubic, tetragonal, orthorhombic, hexagonal, trigonal, monoclinic, triclinic, etc.), as opposed to, for example, randomly distributed pellets of a foam. Owing to the predetermined order of the lattice cell, the mechanical properties of the lattice structure can be predetermined, and in particular, essentially homogeneous and isotropic properties can be provided as explained above. In principle it is also possible that the lattice structure is arranged in an asymmetric and/or random order.

It is noted that the lattice structure may in addition or alternatively to a set of beam-shaped elements comprise a set of tube-shaped elements. The tube-shaped elements may be arranged for example as described with reference to beam-shaped elements above. By means of using tube-shaped elements a certain degree of stiffness may be provided with less material and thus less weight. The tube-shaped elements may comprise various inner and outer cross-sectional contours. For example, a tube-shaped element may comprise, for example, a triangular, rectangular, pentagonal, circular or elliptical outer cross-sectional contour, just as a beam-shaped element. Similarly, and independently from the outer cross-sectional contour a desired inner cross-sectional contour may be provided as needed in the tube-shaped elements. As an example, a tube-shaped element may be provided as a hollow cylinder.

It is emphasized that it is not mandatory that the surface layer comprises a plurality of panels. For example, the surface layer may be a single homogeneous layer or comprise several sublayers, or any other suitable surface layer may be used. For sports balls with or without panels, at least the lattice cells which are adjacent to the surface layer may have at least one dimension which is smaller than an average diameter of a relevant impact area of the ball. For example, an impact area may be that area of the ball surface that has physical contact with the ground when the ball bounces off the ground. A relevant impact area may also be given by the area of contact of the ball with a foot or hand, e.g., when the ball is kicked or hit. For typical soccer balls, an average diameter of a relevant impact area is 5 cm, 3 cm, 1 cm, or 0.5 cm. For other types of balls, e.g., handballs, volleyballs, basketballs, etc., similar impact areas may be present.

As a result, the soccer ball may be provided—with or without panels—wherein at least the lattice cells which are adjacent to the surface layer have at least one dimension which is smaller than 5 cm, smaller than 3 cm, smaller than 1 cm, or smaller than 0.5 cm.

In some examples, all dimensions of the lattice cells adjacent to the surface layer (e.g., radial dimension and lateral dimensions) are smaller than the mentioned size limit (i.e., smaller than 5 cm, smaller than 3 cm, smaller than 1 cm, or smaller than 0.5 cm). In other examples, only the lateral dimensions, or at least one lateral dimension is smaller than the mentioned size limit.

It is noted that, generally, one of the functions of panels is to provide the ball with nice touch characteristics and to provide a certain degree of resilience for low deformations. The lattice structure according to the present invention may be engineered such that it provides, at its outer surface, the desired feel and degree of resilience for low deformations while it also provides the ball with the global stability and bouncing/rebound properties required for high quality balls. In other words, the lattice structure may—in addition to replacing a bladder and/or a carcass of a conventional ball as explained above—also replace the panels of conventional balls. The surface layer may therefore, for example, be implemented as a coating or a foil, e.g., a protective foil.

It is noted, that the sports balls, in some examples, may not have any surface layer at all. For example, this may be the case for indoor soccer balls for which the risk of water or dirt entering the ball is small. For soccer balls without a surface layer, at least the lattice cells which are located at the surface of the ball have at least one dimension which is smaller than the mentioned size limits (i.e., smaller than 5 cm, smaller than 3 cm, smaller than 1 cm, or smaller than 0.5 cm). For example, all dimensions or only the lateral dimensions or at least one lateral dimension may be smaller than the mentioned size limits.

The plurality of lattice cells may form a spherical lattice. Hence, the lattice structure may be provided around the entire surface of the sports ball, such that homogeneous bouncing and/or rebound properties may be provided by the lattice throughout the surface of the ball. In other examples, the plurality of lattice cells may form an ovoid lattice, e.g., if balls other than soccer balls, such as rugby balls or other ovoid balls, are provided.

The lattice structure may comprise a first and a second spherical lattice shell, wherein the first spherical lattice shell encompasses the second spherical lattice shell. Thus, lattice shells with different properties may be provided within the ball. For example, a first, outer lattice shell may be softer than a second, inner lattice shell. Hence, a particular nice feel when kicking the ball may achieved. Also more than two spherical lattice shells may be provided which may be arranged as consecutive shells, e.g. in a consecutively encompassing manner. Similarly, a first, outer lattice shell may comprise a larger material density than a second, inner lattice shell. This density distribution may take into account that generally larger forces arise at the outside of the ball.

At least some of the lattice cells which are adjacent to the surface layer may comprise solid lateral and/or inner walls. Hence, additional stability may be provided to the lattice structure at its outer surface, where larger forces may be expected.

At least some of the lattice cells which are adjacent to the surface layer may comprise an expanded material, preferably expanded thermoplastic polyurethane and/or expanded polyether block amide. Hence, the lattice cells on which external forces are imparted first may be provided in a particularly soft and resilient manner. This may further improve the feel of the ball, virtually eliminating the possibility that the granularity of the lattice will affect the bouncing or kicking properties of the ball. For example, using randomly oriented pellets of expanded thermoplastic polyurethane as expanded material may provide particularly good bouncing properties, e.g., large energy return, which are stable over time, e.g., do not degrade quickly, and which are largely insensitive to temperature. In this context, reference is made, e.g., to the expanded material described in EP 2 649 896 A2.

In particular, at least some of the lattice cells comprising the expanded material may comprise solid lateral and/or inner walls such that the expanded material is encased by the lateral and/or inner walls of the at least some lattice cells. Thus, the deformation modes experienced by the expanded material may essentially be limited to tension and compression. For these deformation modes, particularly advantageous resilience properties may be provided by means of the expanded material. In particular, bending deformation of the expanded material may thus be avoided.

In some examples, the lattice structure may be of tetrahedral type. Such a lattice structure has a plurality of tetrahedral lattice cells. This type of lattice structure has turned out to allow the provision of the desired amount of resilience with a favorable ratio of breaking strength of the lattice structure versus its weight. However, other polyhedral types may also be used, e.g., cubic and/or octahedral and/or dodecahedral.

The lattice structure may comprise at least one lattice cell that is oriented perpendicular to a curvature of the ball, e.g., radially. As an example, the at least one lattice cell may have an axis or a main axis that is oriented perpendicular to a curvature of the ball, e.g., radially. Thus, the force response of the ball may be as natural as possible, such that isotropic bouncing/cushioning and kicking properties are provided. For example, the cells adjacent to the surface layer may all be oriented radially. A further group of cells may be arranged adjacent to these cells (further towards the center of the ball), wherein also the cells of that further group may be oriented radially. The cells of the further group may have a size that is slightly reduced compared to a size of the cells adjacent to the surface layer. One or more further groups of cells may be arranged further radially inwards. In some examples, all cells of the lattice structure may be oriented radially.

The lattice structure may comprise two or more lattice layers which differ in lattice geometry and/or in material properties. Various parameters may be changed from one lattice layer to the other, e.g., the type of the lattice (e.g., from tetrahedral to simple cubic, etc.), the size of a lattice cell, the lattice order (e.g., from tetragonal to orthorhombic, etc.), the orientation of the lattice and/or its material. Hence, the physical properties of the lattice may be varied by various means from one lattice layer to another lattice layer. The properties of the lattice may thus be optimized as needed. For example, a stiffness of the lattice structure may increase towards the center of the ball. The various lattice layers may be integrally manufactured. Alternatively, parts of the lattice structure, e.g., individual layers, may be separately manufactured and subsequently joined, e.g., by applying adhesive, by providing the parts with mechanical connection elements, and/or by applying heat (e.g., welding). It is noted that the two or more lattice layers may be adjacent to each other. The two or more layers may be manufactured within the same manufacturing process. There may be an abrupt transition between the two or more lattice layers. Alternatively, there may be one or more transition zones between two or more lattice layers in which transition zone the geometry and/or material properties of the lattice structure changes continuously. The two or more lattice layers may smoothly merge into each other. The latter may allow to ensure a smooth guiding of the forces within the sports ball which may improve the bouncing and/or rebound properties of the ball.

The lattice structure may comprise at least one auxetic lattice cell. Auxetic cells are generally defined as cells having a negative Poisson's ratio. For example, when stretched, these cells become thicker perpendicular to the applied force. This may be achieved by a hinge-like cell structure which flexes when being stretched. By means of such cells, high energy absorption and/or high fracture resistance may be provided. As a result, highly resilient and durable sports balls, in particular soccer balls, may be provided with less weight.

The lattice structure may comprise a first plurality of lattice cells and a second plurality of lattice cells, wherein the first plurality of lattice cells is larger in size than the second plurality of lattice cells. The first and second plurality of cells may be arranged in different layers of the lattice structure such that these may be provided with different properties as already explained. Alternatively or additionally, however, the first and second plurality of cells may also be combined in a lattice structure irrespective of a possible layer structure. For example, a combination of larger and smaller lattice cells adjacent to the surface layer may help to increase the homogeneity and isotropy of the lattice structure's response to external forces, e.g., bounces and/or kicks.

The lattice structure may at least partly be fabricated by additive manufacturing processes, primary shaping and/or forming, for example by 3D-printing, injection molding and/or thermoforming. For example, the lattice structure may be fabricated by means of 3D printing and/or other additive manufacturing processes, e.g., fused deposition modeling, selective heat sintering, selective laser sintering, fused filament fabrication, stereolithography, digital light processing, etc. This may allow a particularly cost-effective and flexible way to provide a precisely controlled lattice structure.

The complete lattice structure may be integrally fabricated. For example, one of the mentioned fabrication methods may be used for that purpose. In other examples, only parts of the lattice structure are integrally formed by a suitable method, and only subsequently joined, as already explained.

The lattice structure may comprise a polymer material, for example a thermoplastic polyurethane and/or a polyamide, e.g., a polyether block amide. By using such materials, the required amount of resilience and stability may be provided without excessive weight. In particular, non-expanded thermoplastic polyurethane and/or polyamide may be used. Additionally or alternatively, expanded thermoplastic polyurethane and/or polyamide may also be used.

The lattice structure may comprise at least one cavity. For example, the at least one cavity may be filled with air at ambient pressure. For example, the lattice structure may be provided with a full spherical shape and comprise a spherically-shaped cavity in its center. By using such a hollow sphere, a light-weight ball may be provided. Additionally or alternatively, a set of cavities may be used, e.g., a set of cavities may be arranged symmetrically within the lattice structure, e.g., on a sphere with half the ball's radius and/or at other distances to the center of the ball.

According to another embodiment of the present invention, the mentioned problem is solved at least in part by a sports ball having a surface layer and a spherically-shaped homogeneous shell extending below the surface layer. The shell comprises a plurality of openings.

Surprisingly, it has turned out that by means of a suitable combination of material properties and shell thickness, the shell arranged within the ball may provide the ball with homogeneous and isotropic resilience such that the ball has bouncing and rebound properties similar to those of a ball with an inflatable bladder. It is understood, however, that the ball may not comprise an inflatable bladder. By appropriately placing and sizing the openings of the shell, the resilience provided by the shell as well as its deformation properties may be altered and adapted independently from the material used for the shell. The shell may be provided by using, e.g., a suitable self-supporting material such as a stiff polymeric material.

Similarly as explained with respect to the lattice structure embodiment it may be considered that the openings may have at least one dimension which is smaller than an average diameter of optional panels of the ball or smaller than an average diameter of a relevant impact area of the ball.

The surface layer may be provided, for example, by means of a plurality of panels. It may also be provided as a coating or a foil, e.g., a protective foil. The surface layer may protect the sports ball from moisture or dirt, it may provide additional cushioning to the sports ball, and/or it may improve the feel of the ball. However, it is noted that the sports ball may also be provided without any surface layer. This may particularly be the case for indoor soccer balls for which the risk that moisture, or dirt enters the ball is low.

The shell may comprise a polymer material, for example a thermoplastic polyurethane and/or a polyamide, e.g., a polyether block amide. These materials have turned out to allow the provision of a suitable resilience with a favorable breaking strength to weight ratio. In particular, non-expanded thermoplastic polyurethane and/or polyamide may be used. Additionally or alternatively, however, expanded thermoplastic polyurethane and/or polyamide may also be used.

The shell may be at least partly fabricated by additive manufacturing processes, by primary shaping and/or by forming, e.g., by 3D-printing, injection molding, and/or thermoforming. Hence, the shells may be mass fabricated in a cost efficient and flexible manner and their shape may be precisely controlled.

The complete shell may be integrally fabricated. For example, one of the mentioned fabrication methods may be used for that purpose. In other examples, only parts of the lattice structure are integrally formed by a suitable method, and only subsequently joined, as already explained.

The sports balls as explained above may be provided with a lattice structure or a shell that is adapted such that the sports ball bounces at least 0.5 m, at least 1.0 m, or at least 1.35 m, when dropped on a steel plate from a height of 2 m. Hence, the bouncing/rebound properties of a high-quality sports ball may be provided without requiring an inflatable bladder.

Similarly, the sports balls as explained above may be provided with a lattice structure or a shell that is adapted such that the ball deviates from sphericity by less than 5%, less than 2%, or less than 1.5%, after hitting a steel plate with a speed of 50 km/h for 2000 times. Hence, sports balls which do not lose their shape over time may be provided, even without an inflatable bladder, as required for high-quality balls.

Finally, it should be noted that while soccer balls have been mentioned above, other sports balls, e.g., sports balls which heretofore generally comprised inflatable bladders, may also be provided with the aspects as explained in the preceding paragraphs. In particular, e.g., handballs, basketballs, volleyballs, etc. may be provided with the aspects described herein. Similarly, American footballs, Canadian footballs, Australian footballs, or rugby balls may also be provided with the aspects described herein. Non-inflatable sports balls such as medicine balls, golf balls, etc., may also be provided with the aspects described herein.

In general, sports balls may be provided with a surface layer and a non-inflatable core structure (e.g., lattice structure or spherically-shaped homogeneous shell) whose geometry is three-dimensionally adapted to provide the ball with homogeneous and isotropic bouncing and/or rebound properties as well as to provide the ball with a balanced weight distribution.

Besides avoiding the disadvantages associated with inflatable bladders as already mentioned, the absence of an inflatable bladder may also facilitate providing the ball with electronic components, e.g., displays, sensors, lighting elements such as LEDs or OLEDs, etc. The interior of the ball—instead of being occupied by an inflatable bladder—may be freely used to place said components. To this end, the lattice structure may be used as a carrier for such components, and it may be provided, for example, with one or more cavities, recesses, etc. in which one or more components may be inserted.

Finally, sports equipment other than balls may also benefit from the aspects described herein. For example, the aspects may be used to improve ice hockey pucks or similar sports projectiles or protective gear, such as protective headwear, helmets etc. In addition, footwear cushioning may benefit from the aspects described herein.

In some examples, a lattice structure and/or a homogeneous shell may also be combined with an inflatable bladder. For example, any of the sports balls described herein, may comprise an inflatable bladder.

For example, a sports ball may comprise a lattice structure, wherein the lattice structure comprises a plurality of lattice cells comprising radially extending elements, wherein the lattice structure encompasses an inflatable bladder. For example, the lattice structure may comprise a cavity, e.g., a spherical cavity, and the inflatable bladder may be arranged within the cavity. In another example, a sports ball may comprise a lattice structure, wherein the lattice structure comprises a plurality of lattice cells comprising radially extending elements, wherein the lattice structure is arranged inside an inflatable bladder. The lattice structure may comprise any of the features as described herein, and it may be combined with any further elements and/or features as described herein, e.g., a surface layer with panels, etc.

According to a further example, a sports ball may comprise a homogeneous shell comprising a plurality of openings, wherein the shell encompasses an inflatable bladder. In another example, a sports ball may comprise a homogeneous shell comprising a plurality of openings, wherein the shell is arranged inside an inflatable bladder. The shell may comprise any of the features as described herein, and it may be combined with any further elements and/or features described herein, e.g., a surface layer, etc.

The above examples may combine the benefits associated with a lattice structure and/or a homogenous shell as explained (e.g., customized bouncing/rebound properties, engineering of momentum of inertia, etc.) with further design freedom provided by a bladder. For example, a bladder could provide basic bouncing properties, and a lattice structure arranged around it may be used to engineer the gripping properties (e.g., for an American football, or for any other sports ball) or fine-tune the rebound properties (e.g., a soccer ball could be adapted to be more suitable for indoor soccer, futsal, generally for performing tricks, or for outdoor soccer).

The combination of the lattice structure or homogeneous shell with a bladder also opens up the possibility to use a wide range of materials—both for the bladder, and the lattice structure/the homogeneous shell. For example, the material requirements regarding the lattice structure or homogeneous shell (or the bladder) may be less strict if additional stability and/or basic rebound properties are provided by a bladder (or the lattice structure/homogeneous shell). Hence, new groups of materials can be used, which may facilitate a simpler and/or more cost-effective manufacturing.

In another aspect, combining a bladder with a lattice structure or a homogeneous shell may allow lowering the pressure that is required inside the bladder. This generally results in lower leakage and higher durability of the bladder.

For example, a lattice structure encompassing an inflatable bladder may comprise two or more lattice layers each comprising a plurality of cells. One or more cells of an outer lattice layer may comprise at least one dimension, which is approximately 1.5 times to 3 times larger, e.g., approximately 2 times larger than a dimension of one or more cells of an inner lattice layer. The at least one dimension could be a radial dimension and/or one or two lateral dimensions of the cells.

The bladder may comprise at least one reinforcing element. This may provide the bladder with increased stability, although it may only be inflated to lower pressure. For example, the at least one reinforcing element may comprise a fabric. For example, the at least one reinforcing element fabric may be bonded to the bladder, with or without adhesive. In some examples, a plurality of reinforcing elements may be arranged in an overlapping manner on the bladder. In some examples, the fabric may be fiber-reinforced.

In some examples, the bladder may comprise a membrane which may be airtight and/or elastic. The membrane may comprise at least one reinforcing element. The at least one reinforcing element may comprise a fabric. For example, the at least one reinforcing element fabric may be bonded to the membrane, with or without adhesive. In some examples, a plurality of reinforcing elements may be arranged in an overlapping manner on the membrane. In some examples, the fabric may be fiber-reinforced. It is also possible that the membrane itself is fiber-reinforced.

The membrane may comprise latex, rubber, in particular butyl rubber, and/or thermoplastic polyurethane.

The bladder may not comprise any carcass. However, in some examples, additionally providing a carcass may also be useful.

The bladder may comprise at least one slip-inhibiting element adapted to contact the lattice structure or the homogenous shell. Additionally or alternatively, the bladder may be joined to the lattice structure or the homogeneous shell, e.g., by bonding. Thus, a relative movement between bladder and lattice structure and homogeneous shell, respectively, may be inhibited.

In some examples, the bladder may be adapted to be inflated to a pressure of approximately 0.01 bar to 0.5 bar, 0.02 bar to 0.3 bar, 0.05 bar to 0.15 bar, or of approximately 0.1 bar. At the same time, the bladder may be adapted to exhibit a predetermined shape at the mentioned pressure ranges, e.g., spherical in case of a soccer ball, or generally spheroid, e.g., in case of an American football. Generally, such pressure ranges may be sufficient to provide consistent bouncing properties for sports balls (e.g., soccer balls, American footballs, rugby balls, volleyballs, basketballs, etc.), owing to the additional stability provided by the lattice structure or homogeneous shell. The lower pressure may reduce leakage and increase durability of the sports ball.

The bladder may comprise a valve, wherein the bladder and/or the lattice structure and/or the homogeneous shell are adapted such that the weight of the valve is balanced (e.g., such that a balanced ball is provided).

The lattice structure or the homogeneous shell may comprise a spheroid shape, e.g., a spherical shape. The bladder may be inserted or wrapped around the lattice structure or the homogeneous shell. The lattice structure and the homogenous shell may be manufactured as a single piece. The bladder may then, e.g., be inserted through an opening of the lattice structure or the homogeneous shell. Alternatively, the lattice structure and the homogeneous shell may be manufactured as several pieces, which are then joined to each other to encompass the bladder. In some examples, the lattice structure or the homogenous shell may be additively manufactured on the bladder, e.g., by means of 3D printing or any other additive manufacturing technique.

The lattice structure and the homogeneous shell may comprise a polymer material, e.g., thermoplastic polyurethane, polyamide, and/or polyether block amide. They may generally be at least partly additively manufactured, primary shaped (e.g., cast) and/or formed, as explained.

BRIEF DESCRIPTION OF THE FIGURES

In the following detailed description, embodiments of the present invention are described in more detail with reference to the following figures.

DETAILED DESCRIPTION OF THE INVENTION

Figure 1A:
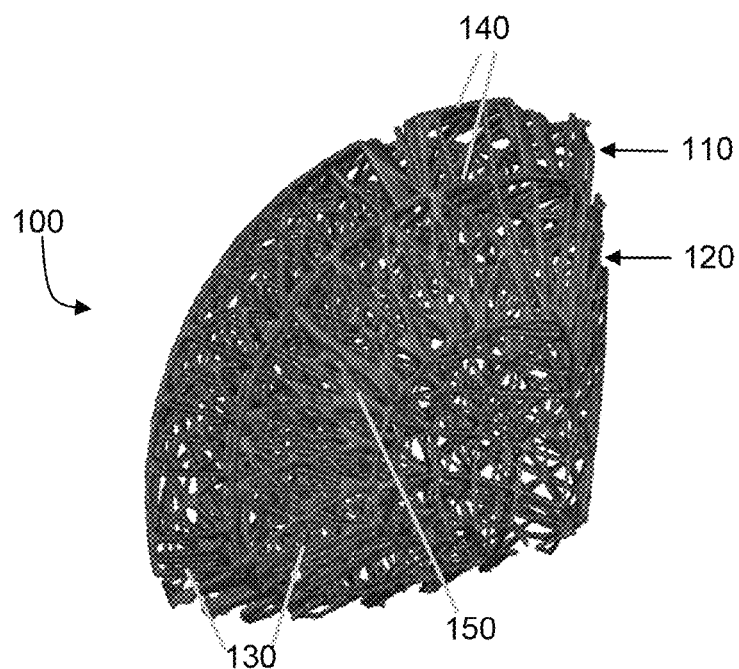
FIGS. 1A-D show aspects of a lattice structure according to some embodiments.

Possible embodiments of the present invention are described in the following detailed description, mainly in relation to soccer balls. However, the present invention is not limited to these embodiments. As already mentioned in the summary section, the present invention may easily be applied to other types of resilient sports balls, such as basketballs, volleyballs, handballs, etc.

It is also to be noted that only some of the multitude of possible embodiments of the present invention can be described in greater detail below and that not all possible combinations and permutations of the various aspects provided by the present invention can explicitly be discussed. However, it is clear to the person skilled in the art that the aspects described in relation to the specific embodiments discussed below can also be further modified and can also be combined with each other in a different manner within the scope of the present invention. Individual features can also be omitted where they appear to be not mandatorily required. In order to avoid redundancies, reference is made to the explanations in the previous sections, which are also applicable to the following detailed description.

Throughout the following description, like reference numerals will be used to designate functionally similar or corresponding parts and the explanations regarding a specific part made in the context of a specific embodiment also pertain to the corresponding parts in other embodiments.

Figure 1B:
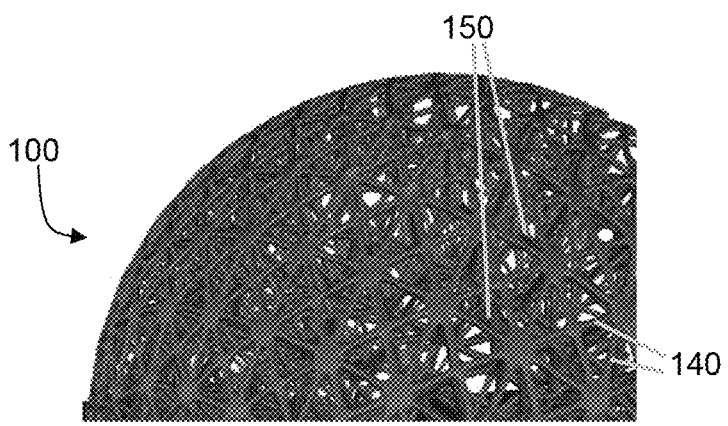
Figure 1C:
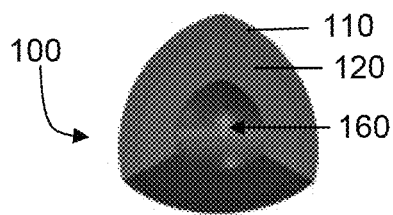

FIGS. 1A and 1B show an inner (as seen from within a ball) and an outer view (as seen from outside of a ball) of a portion 100 of a lattice structure for a ball. Four such portions 100 may be joined to form an entire spherical lattice structure for a ball. Each portion 100 comprises a first lattice layer 110 and a second lattice layer 120. The first lattice layer 110 is adapted to be adjacent to a surface layer of a ball. The first lattice layer 110 encompasses the second lattice layer 120. The second lattice layer 120 does not extend to the center of the ball. Rather, the second lattice layer 120 is shaped such that a spherical cavity is formed at the center of the ball. This is also illustrated in FIG. 1C which shows a schematic representation of the portion 100 with first lattice layer 110, second lattice layer 120 as well as spherical cavity 160.

As shown in FIGS. 1A and 1B, the lattice structure comprises a plurality of elongate or beam-shaped elements. In other examples the elements (lattice elements) may also be provided, for example, as tube-shaped elements. The lattice structure in particular comprises a plurality of radially extending elements 130. In other words, these elements 130 extend essentially radially with respect to the ball in which the portion 100 is to be inserted. Besides the radially extending elements 130, the lattice structure also comprises a plurality of non-radial elements 140. The non-radial elements 140 may extend essentially parallel to the curvature of the ball.

The radially extending elements 130 are (predominantly) arranged within the first lattice layer 110 and within the second lattice layer 120, respectively. The non-radial elements 140 are (predominantly) arranged at the interfaces of the first lattice layer 110 and the second lattice layer 120. At the outer interface of the first lattice layer 110 (which is designated to be adjacent to a surface layer of a ball), the non-radially extending elements 140 may be arranged to form an essentially spherically shaped surface in order to provide a large area of contact with an adjacent surface layer of a ball (or possibly with an optional intermediate layer that may be provided between the adjacent surface layer and the lattice structure). Forces applied to the lattice structure via the surface layer of the ball may thus be evenly distributed around a spherically shaped surface of the lattice structure. Similarly, an approximately spherically shaped interface may be provided at the interface between the first lattice layer 110 and the second lattice layer 120. Thus, forces may be guided smoothly between first lattice layer 110 and second lattice layer 120. Finally, the inner interface of the second lattice layer 120 (which faces the central cavity) may also be provided with an essentially spherical shape. Thus, the forces may be homogeneously and isotropically absorbed by the inner interface of the lattice structure and reflected back outwards towards the surface of the ball.

The first lattice layer 110 and the second lattice layer 120 may be provided with different physical properties, e.g., as already explained. In other examples, only a single lattice layer (cf., for example FIGS. 3A-B and 4A-B), or more than two lattice layers may be provided.

In order to provide the lattice structure with increased stability, the elements of the lattice may be provided with local thickenings 150, e.g., at locations in which particularly large forces are expected. This may increase the stability and/or breaking strength of the lattice with only minimally added weight. Moreover, selective thickenings 150 may improve the guiding of the forces within the lattice.

Figure 1D:
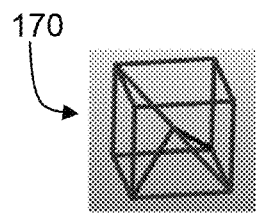

The first lattice layer 110 and/or the second lattice layer 120 may comprise one or more lattice cells which are arranged at predetermined, regular locations. The lattice cells may be oriented radially, i.e., along the direction of the expected major force component. Radially oriented lattice cells may facilitate a homogeneous force distribution within the lattice structure. An example lattice cell 170 is shown in FIG. 1D. The lattice cell 170 is an example for a tetrahedral lattice cell. One of the major axes of the lattice cell 170 may be arranged radially.

A lattice cell of the first lattice layer 110, in the case of a regular soccer ball, may generally comprise a depth (in radial direction of the ball) of for example approximately 0.1 cm to 5 cm, 0.5 cm to 4 cm, 1 cm to 3 cm, 1.5 cm to 2.5 cm, or 2 cm. The lateral dimensions (in non-radial direction of the ball) may range from approximately 0.1 cm to 4 cm, 0.3 cm to 3 cm, 0.5 cm to 2.5 cm, 1 cm to 2 cm, or they may be approximately 1.5 cm. A lattice cell of the second lattice layer 120 may have similar lateral dimensions. The depth of the second lattice layer 120 may be for example approximately 0.1 cm to 6 cm, 0.5 cm to 5 cm, 1 cm to 4 cm, 2.5 cm to 3.5 cm, or 3 cm. For sports balls other than regular soccer balls, e.g., handballs, junior soccer balls, etc., corresponding dimensions, e.g., smaller/larger for a smaller/larger ball, etc., may be used for the first lattice layer 110 and/or the second lattice layer 120.

Figure 2A:
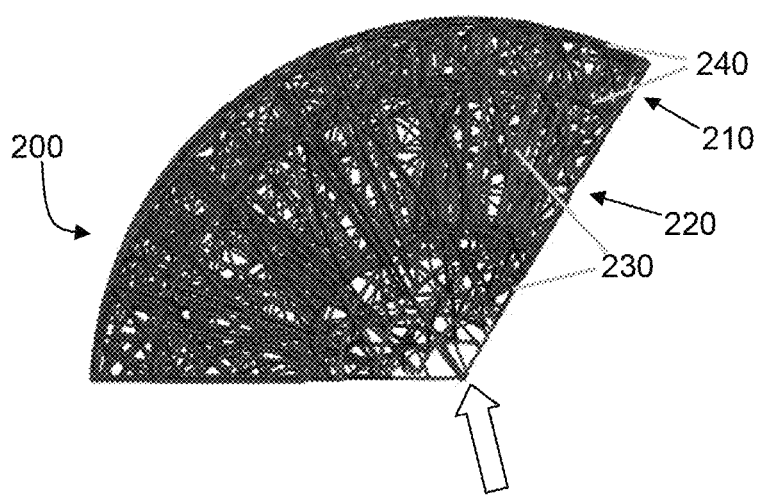
FIGS. 2A-E show aspects of a lattice structure according to some embodiments.

FIG. 2A shows another example for a portion 200 of a lattice structure. Four portions 200 may be connected to form a full spherical lattice structure. The lattice structure comprises a plurality of beam-shaped elements forming lattice cells. For example, tetrahedral cells or any other cells may be formed by the beam-shaped elements.

The lattice structure according to portion 200 comprises a first lattice layer 210 and a second lattice layer 220. Radially extending elements 230 are predominantly arranged within each of lattice layers 210 and 220, whereas non-radially extending elements 240 are predominantly arranged at the interfaces of the lattice layers 210 and 220. The beam-shaped elements, the lattice cells, and/or the lattice layers may generally be similar to those explained with reference to FIGS. 1A-D.

Figure 2B:
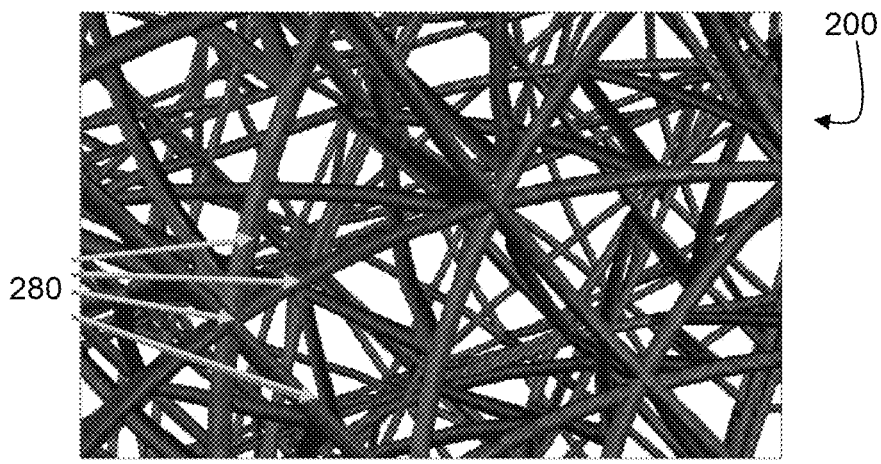

FIG. 2B shows a close-up view of the inner interface of the second lattice layer 220 (the direction of view used in FIG. 2B is indicated by the large arrow in FIG. 2A). The inner interface of the second lattice layer 220 may be approximately spherically shaped such that a central cavity is formed, similarly as explained with reference to FIGS. 1A-D. The inner interface comprises a plurality of beam-shaped and non-radially extending inner elements 280. The inner elements 280 may have a circular cross-section. Moreover, the inner elements 280 may be arranged such that at least some of them essentially form great circles along the spherical inner interface of the second lattice layer 220. This may maximize the isotropy of the bouncing properties provided by the lattice structure.

Figure 2C:
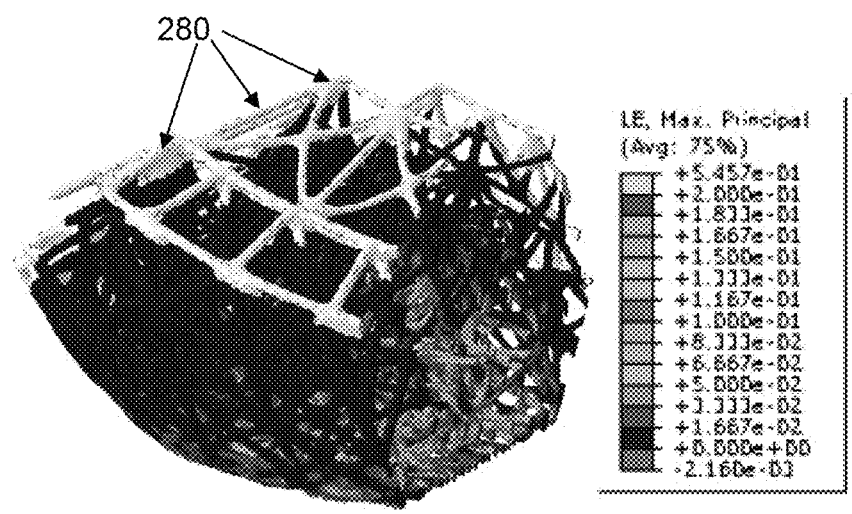

FIG. 2C shows a finite element simulation of the expected strain distribution in a section of portion 200. The inner elements 280 are marked in FIG. 2C in order to facilitate the understanding of FIG. 2C. The inset of FIG. 2C shows a scale bar of the expected strain distribution when the lattice structure experiences a typical bounce. As confirmed by the simulation results, a smooth strain distribution is achieved which ensures isotropic and homogeneous bounce properties and minimizes the risk of breaking. Maximum strains may be approximately 15%. In particular, the strain as well as the pressure is approximately equally distributed in a symmetric manner above the area of contact of the ball with the ground such that homogenous bouncing and/or rebound properties may be provided.

Figure 2D:
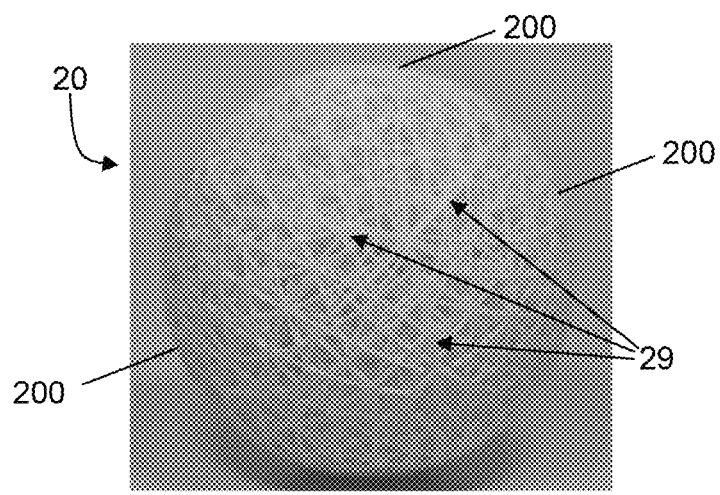

FIG. 2D shows a lattice structure 20 which is formed by connecting three portions 200 of FIG. 2A. The three portions 200 may be connected to each other along connecting lines 29 by suitable means as described. An essentially perfectly balanced lattice structure may thus be provided which may then be combined with a surface layer in order to form a balanced ball, e.g., soccer ball.

Figure 2E:
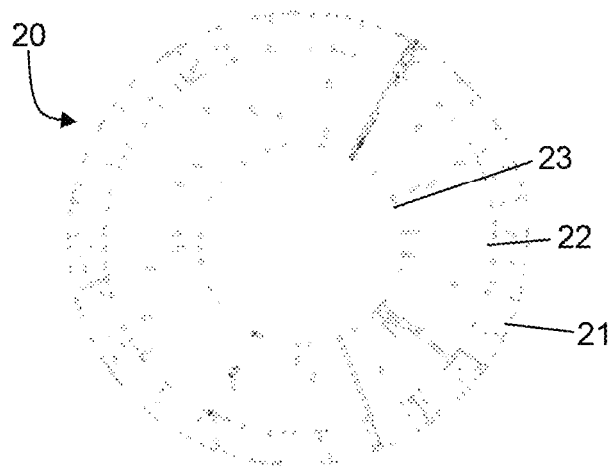

FIG. 2E shows a random cross section through the lattice structure 20 of FIG. 2D. As can be seen, the lattice structure 20 comprises a comparatively high density at the outer interface 21 of the first lattice layer, the inner interface 23 of the second lattice layer, as well as the interface 22 between first lattice layer and second lattice layer. A smooth distribution of the forces around the ball may thus be facilitated by these spherically shaped interfaces 21-23, as described.

Figure 3A:
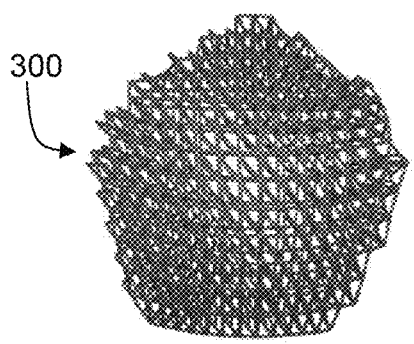
FIGS. 3A-B show aspects of a lattice structure according to some embodiments.
Figure 3B:
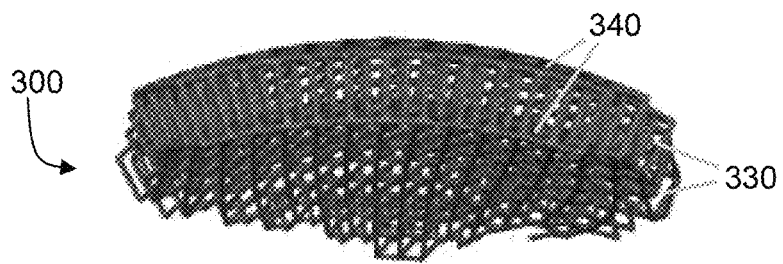

FIGS. 3A-B show a top view and a side view, respectively, of a portion 300 of a further example lattice structure. The portion 300 comprises a single lattice layer. The portion 300 has an approximately pentagonal shape and 12 portions 300 may be joined by suitable means, e.g., as already explained, to form a full spherical lattice structure. As can best be seen from FIG. 3B, the lattice structure comprises a plurality of beam-shaped elements which include radially extending elements 330 arranged between the interfaces of the single lattice layer. Arranged at the inner and outer interfaces of the single lattice layer, there are a plurality of non-radial elements 340. These may be arranged such that an essentially spherical inner and/or outer interface of the single lattice layer is provided, as already described for the lattice layers with reference to FIGS. 1A-D.

The lattice structure according to portion 300 may comprise one or more types of lattice cells. For example, tetrahedral lattice cells may be used. The single lattice layer according to portion 300 may be formed by a single layer of cells. The lattice layer, and a corresponding lattice cell, may have a depth of approximately 0.1 cm to 4 cm, 0.3 cm to 3 cm, 0.5 cm to 2 cm, or 1 cm. A lattice cell may, e.g., have lateral dimensions of approximately 0.1 cm to 3 cm, 0.3 cm to 2 cm, 0.3 cm to 1.5 cm, or 0.5 cm.

Figure 4A:
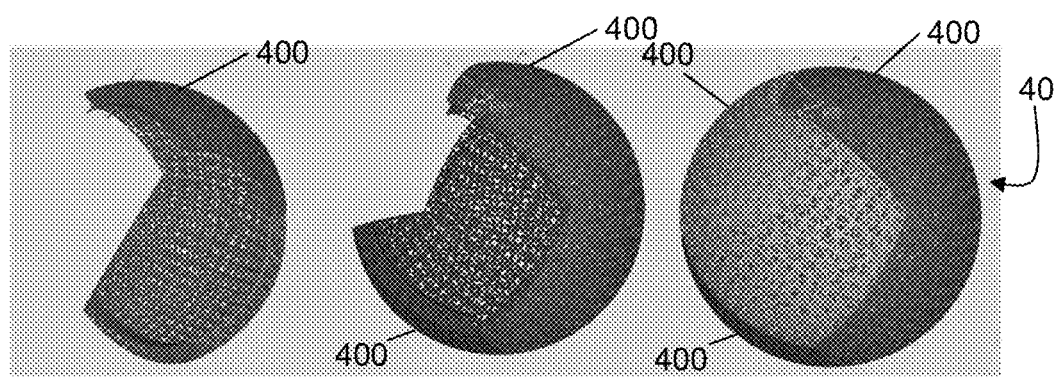
FIGS. 4A-B show a lattice structure according to some embodiments.
Figure 4B:
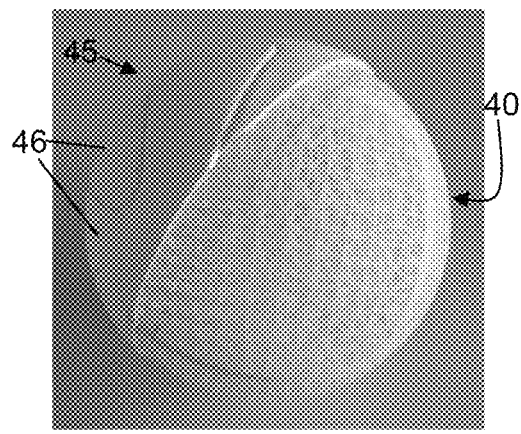

FIGS. 4A-B show a further example for a lattice structure 40 comprising three portions 400. Three essentially identical portions 400 may be connected to form the full spherical lattice structure 40, as illustrated in FIG. 4A. Each portion 400 may comprise lattice elements, one or more lattice cells and one or more lattice layers as described earlier, e.g. with respect to FIGS. 1A-D, 2A-E, 3A-B. As shown in FIG. 4B, the lattice structure 40 may be covered by a surface layer 45 which may comprise a plurality of panels 46 such that a sports ball, e.g., a soccer ball, is provided. For illustration purposes, only a part of the surface layer 45 is depicted in FIG. 4B.

Figure 5:
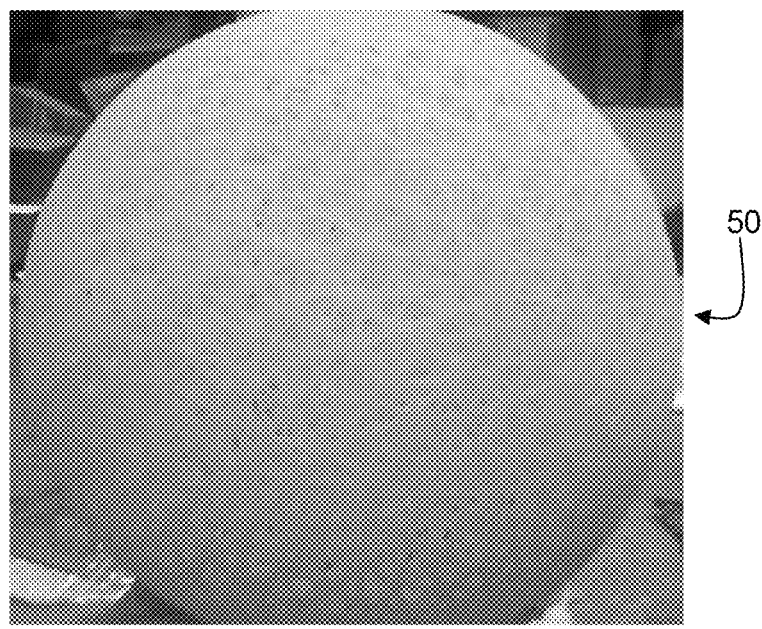
FIG. 5 shows a lattice structure according to some embodiments.

FIG. 5 shows an example for a lattice structure 50 which may be completely integrally formed. No connecting elements, adhesives, etc. are required for lattice structure 50 which may thus be efficiently manufactured and particularly lightweight. Moreover, a possible breaking of the lattice structure 50 along connecting elements and/or connecting lines is excluded. Lattice structure 50 may be fabricated, for example, by means of 3-D printing. Lattice structure 50 may—apart from being integrally fabricated—be similar to any lattice structures that may be provided by means of the portions 100, 200, 300, and/or 400 as explained with reference to FIGS. 1A-D, 2A-E, 3A-B, and 4A-B.

Figure 6A:
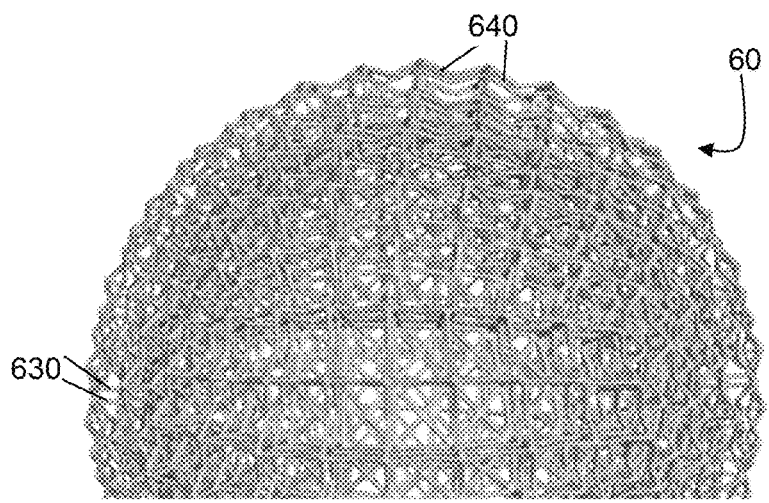
FIGS. 6A-D show a lattice structure according to some embodiments.

FIG. 6A shows a further example for a lattice structure 60. Lattice structure 60 may generally comprise any of the features described heretofore. In particular, the lattice structure 60 comprises a plurality of beam-shaped elements comprising radially extending elements 630 and non-radial elements 640. The outermost lattice layer of lattice structure 60 comprises a plurality of radially oriented cubically shaped lattice cells. The non-radial elements 640 defining the openings of each of these lattice cells at the outer interface towards the periphery of the lattice structure may not be arranged to provide an essentially spherical outer interface as described, for example, with respect to FIGS. 1A-D. Instead, these non-radial elements 640 may be slightly buckled or inclined towards the ball center in between two radially extending elements 630. In other examples, however, these non-radial elements 640 may be arranged to provide an essentially spherical outer interface.

Figure 6B:
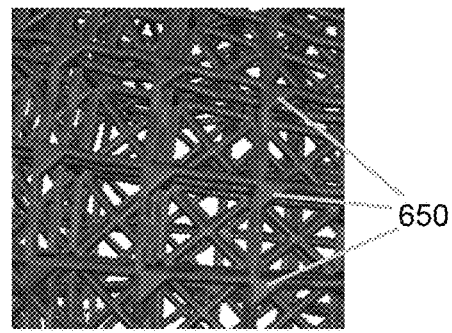

Optionally, one or more thickenings may be provided at the outer interface of the lattice structure 60. For example, thickenings may be provided at the various joining positions at which respective four non radial elements 640 defining the openings join each other. Such thickenings may be provided as symmetrical disks, wherein each disk is centered at the respective joining position. In other examples, the thickenings may be provided in other shapes, e.g., triangular, rectangular, pentagonal shape, etc. For example, one triangular thickening 650 may be provided at one or more corners of each opening, as exemplarily shown in FIG. 6B.

In an example, the lattice structure 60 may comprise polyether block-amide. The polyether block-amide may be provided with a density of approximately 1 kg/m$^3$ to 1.4 kg/m$^3$, or approximately 1.2 kg/m$^3$. In such examples, the lattice structure 60 may be provided with a diameter of approximately 20 cm to 22 cm at a weight of approximately 300 g to 390 g, such as 345 g.

Figure 6C:
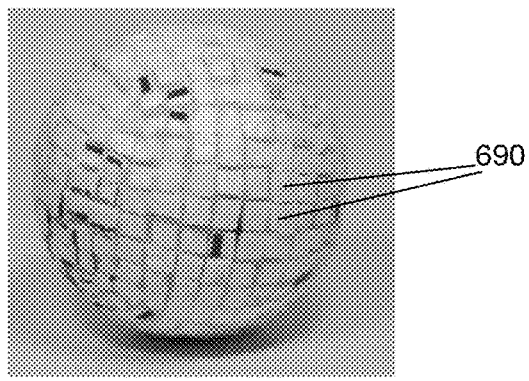

The lattice cells of the outermost lattice layer may be filled with an expanded polymeric material 690, e.g., expanded thermoplastic polyurethane and/or expanded polyether block amide, as depicted in FIG. 6C. The expanded polymeric material 690 may comprise various elements whose sizes are adapted to fit into the lattice cells of the outermost lattice layer of lattice structure 60. The elements of the expanded polymeric material 690 may additionally be bonded to the beam-shaped elements of the lattice structure 60 by using adhesive and/or heat-bonding. A bonding may not be required since a sufficient fixation of the expanded polymeric material 690 may also be achieved by surrounding the lattice structure 60 with a surface layer.

The outer surface of each element of the expanded polymeric material 690 (facing the periphery of the ball) may be adapted such that the lattice structure is provided with an essentially spherical surface. Hence, as explained earlier, homogeneous and isotropic bouncing/rebound properties may be provided. The aforementioned buckling/inclination of the non-radial elements 640 at the outer interface of the lattice structure 60 may help to ensure that external forces are always transferred to the ball via the expanded polymeric material 690 and only indirectly guided to the lattice structure 60.

The lattice cells of the outermost lattice layer and thus the elements of the expanded polymeric material 690 may comprise dimensions of approximately (1 cm to 3 cm)×(1 cm to 3 cm)×(1 cm to 3 cm), or (1.5 cm to 2.5 cm)×(1.5 cm to 2.5 cm)×(1.5 cm to 2.5 cm), or 2 cm×2 cm×2 cm.

In other examples, only some of the lattice cells of the outermost lattice layer may comprise expanded polymeric material and/or lattice cells in other lattice layers may comprise expanded polymeric material. Also, apart from the specific example shown in FIGS. 6A-C other lattice cell shapes, e.g., triangular, pentagonal, spherical, etc., and other lattice cell sizes may be used.

Figure 6D:
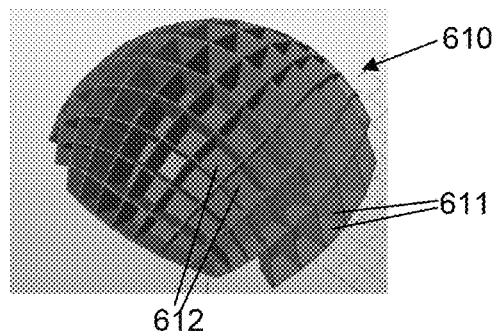

A further variation of the lattice structure will now be explained with reference to FIG. 6D. FIG. 6D shows an alternative layout 610 of the outermost lattice layer of lattice structure 60. In contrast to the embodiment shown in FIG. 6A, the outermost lattice layer according to FIG. 6D may comprise a plurality of lattice cells which comprise solid lateral walls 611 and/or solid inner walls 612. The expanded polymeric material 690 may be inserted into the lattice cells, and optionally also bonded with the lattice cells, e.g., as explained above. As already explained, by encasing the expanded polymeric material 690 with solid lateral walls 611 and/or inner walls 612, the mechanical properties of the lattice structure may be improved.

In summary, the combination of the lattice structure 60, which could be fabricated, for example, from a relatively stiff material (e.g., non-expanded thermoplastic polyurethane and/or polyamide), with an expanded material, which could provide, for example, a larger degree of cushioning and energy return, a sufficiently stiff ball which at the same time provides a large degree of energy return and a soft feel may be provided.

Figure 7A:
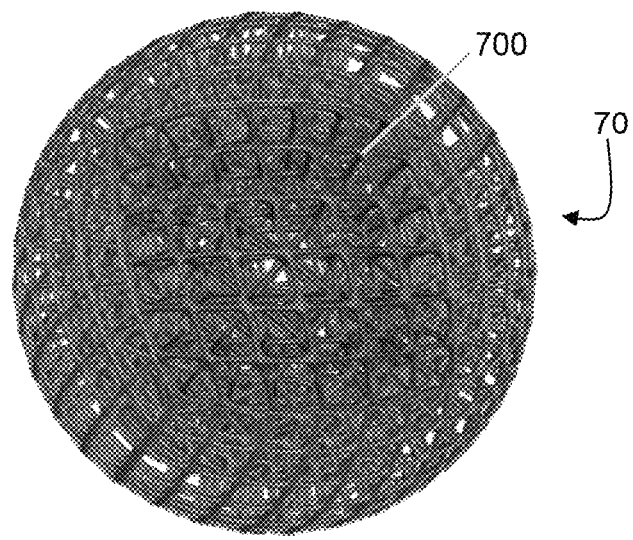
FIGS. 7A-E show a lattice structure according to some embodiments.

FIGS. 7A-E show a further example for a lattice structure 70. As shown in FIG. 7A, the lattice structure 70 comprises a spherical shape. The lattice structure 70 comprises twelve, possibly identical, portions 700. It is noted that the 12 portions forming the lattice structure 70 may be integrally formed, e.g., by means of any of the aforementioned fabrication methods, or they may be fabricated separately and subsequently joined to each other, as already explained. The different shading shown in FIG. 7A for portion 700 does not imply that this portion is necessarily fabricated separately but only serves illustrative purposes.

Figure 7B:
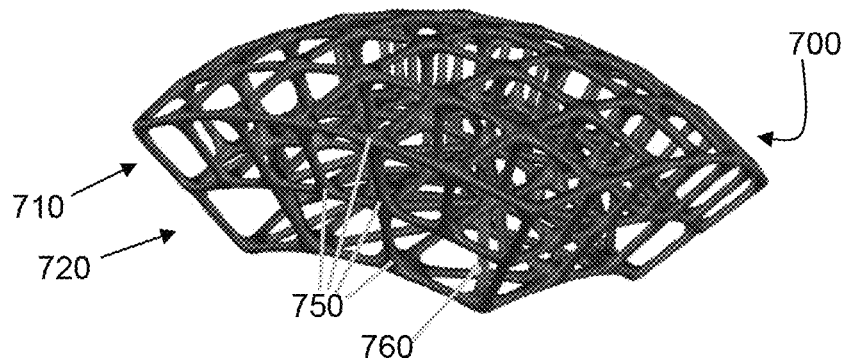
Figure 7C:
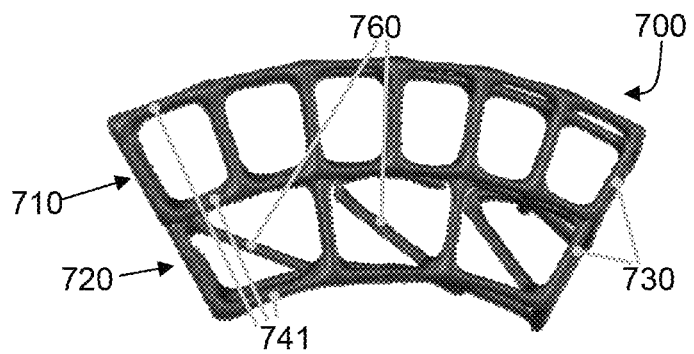
Figure 7D:
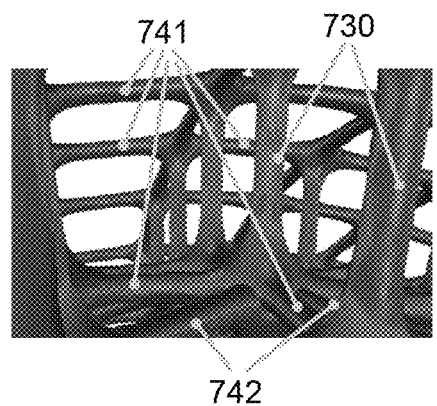

Details of the structure according to portion 700 are depicted in FIGS. 7B-7D. As may best be seen from FIGS. 7B and 7C, the portion 700 comprises a first lattice layer 710 and a second lattice layer 720 which may comprise a plurality of beam-shaped elements 741, 742, 730, and 760. The beam-shaped elements may be arranged to form a plurality of cubic cells in the first lattice layer 710 and in the second lattice layer 720. One or more of the cells of the first lattice layer 710 and the second lattice layer 720 may be radially oriented. When compared to the lattice structure described with reference to FIGS. 1A-1D which also comprises a first lattice layer and a second lattice layer, the lattice structure 70 may comprise a simpler structure which is based on slightly thicker beam-shaped elements with more open space between the individual elements. The simpler structure may lead to a simplified and more ordered optical appearance as well as to a reduced weight.

The first lattice layer 710 comprises a number of 36 cubic cells. The cubic cells may have approximately quadratic faces at an inner interface and an outer interface of the first lattice layer 710. In other words, the faces of each cell of the first lattice layer 710 which face radially inwards and outwards, respectively, may be approximately quadratic. The depth of each cell of the first lattice layer 710 may be slightly larger than its lateral dimensions. In other examples other shapes and other numbers of cells may be used for the first lattice layer 710. Four non-radial elements 741 arranged in the form of a square may form the outer interface of each cell of the first lattice layer 710 which faces radially outwards. Moreover, each cell may comprise four radially extending elements 730. The inner interface of each cell of the first lattice layer 710 may again be formed by four non-radial elements 741 which are arranged in the form of a square. Moreover, the inner interface of each cell may comprise one or more further non-radial element 742 which may extend diagonally across the square formed by the four non-radial elements 741 of the inner interface of each cell of the first lattice layer 710, as shown in the example of FIG. 7D.

The second lattice layer 720 comprises a number of nine cubic cells. Similarly to the cells of the first lattice layer 710, the cells of the second lattice layer 720 may each comprise an inner interface and an outer interface which is each formed by four non-radial elements 741 arranged in the form of a square. Moreover, each cell of the second lattice layer may comprise four radially extending elements 730. As explained with respect to the cells of the first lattice layer 710, the cells of the second lattice layer 720 may also have one or more additional non-radial elements which extend diagonally across the square formed by the four non-radial elements 741 of the inner interface of each cell. The cells of the second lattice layer 720 may additionally comprise one or more elements 760 which extend diagonally across the cell from the inner interface to the outer interface of the cell. For example, one or more elements 760 extending along one or more principal diagonals of a cell of the second lattice layer 720 may be provided. Other shapes and numbers of cells may also be used for the second lattice layer 720. Each cell of the second lattice layer 720 may be dimensioned and/or positioned such that it is arranged underneath a set of four cells of the first lattice layer 710.

By means of the one or more diagonal elements 760, possibly combined with one or more diagonal non-radial elements 741 at the inner interface of the second lattice layer 720 and/or the first lattice layer 710, the second lattice layer 720 may be provided with increased stiffness compared to the first lattice layer 710. As a result, the first lattice layer 710 may be more compliant than the second lattice layer 720. This may help provide a ball that feels sufficiently soft at its outer surface but nevertheless is sufficiently stiff and stable to cope with the large forces that may arise during use.

At positions at which one or more lattice elements join each other, thickenings 750 may be provided, as explained, for example, with reference to FIGS. 1A-1B.

Figure 7E:
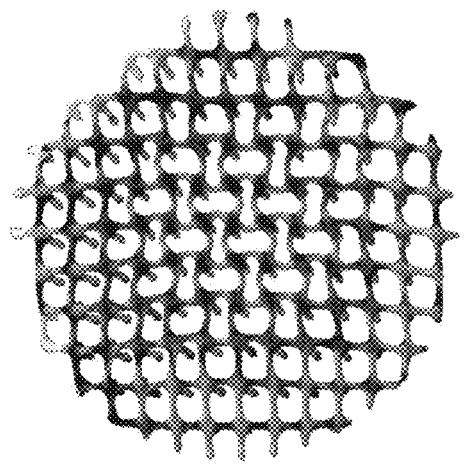

FIG. 7E shows an example for a strain distribution in the outer interface of the first lattice layer 710 of portion 700 assuming a typical impact force, e.g., as expected when the lattice structure 70 bounces off the ground. As can be seen from FIG. 7E, there is a predominant in-plane strain at the center of the portion which leads to an in-plane bending of the non-radial elements forming the outer interface of the portion. The lattice cells may thus be considered to contract in-plane, which leads to a stiffening of the outer interface in radial direction. This, in turn, may help to avoid a snap-through of the lattice structure in radial direction at high impact forces.

It is noted that in the examples of FIGS. 7A-7E the lattice structure 70 and the corresponding portions 700 may have a size such that the lattice structure 700 comprises a diameter of approximately 20 cm to 22 cm. The various beam shaped elements depicted in FIGS. 7A-7E may be dimensioned to scale accordingly.

The lattice structure 70 may be fabricated by any of the methods and materials as explained earlier. In an example, polyether block-amide may be used. The polyether block-amide may for example be provided with a density as indicated with reference to FIG. 6A. The lattice structure 70, having a diameter of approximately 20 cm to 22 cm, may then for example comprise a weight of 360 g to 440 g, such as 420 g.

Figure 8:
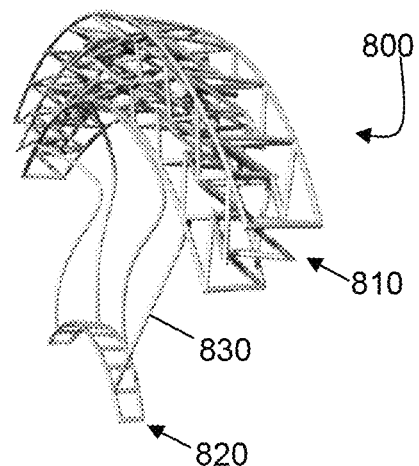
FIG. 8 shows an auxetic cell according to some embodiments.

FIG. 8 shows an example for an auxetic cell 800 which may be used in any of the embodiments described heretofore. The cell 800 comprises a plurality of beam-shaped elements. The beam-shaped elements are arranged such as to form a first arch 810 and a second arch 820 which are connected by plural radially extending connecting elements 830. The first and second arch 810 and 820 may be arranged within a ball such that these extend tangentially with respect to a ball. When a radial compression force is applied to the cell 800, i.e., a force acting radially from the first arch 810 towards the second arch 820, the first arch 810 is moved towards the second arch 820 while at the same time the first arch 810 contracts in tangential direction. Hence, instead of a regular cell in which a radial compression force would lead to a tangential dilation (and thus to a weakening of the material), with an auxetic cell such as cell 800, a tangential contraction is achieved such that the material of the cell is "sucked" towards the zones of high compression. Thus, a larger energy return as well as a higher breaking strength may be achieved.

Figure 9A:
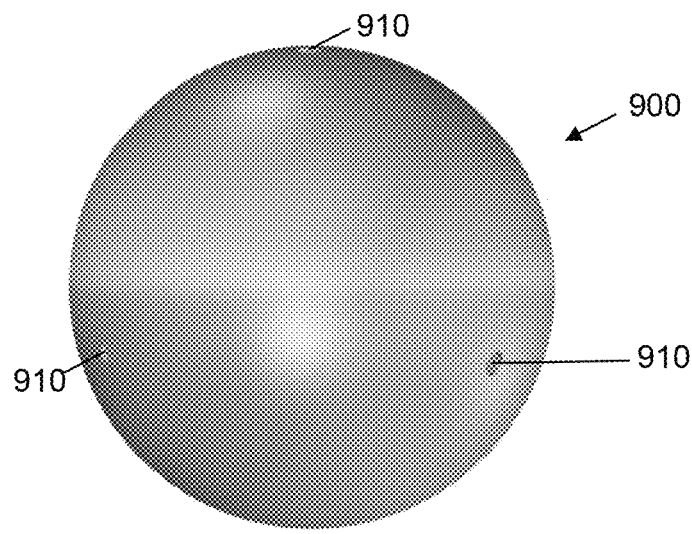
FIGS. 9A-B show a spherically-shaped homogeneous shell according to some embodiments.

FIG. 9A shows an example for a homogeneous spherical shell 900 which comprises a plurality of openings 910. The openings 910 are evenly distributed over the surface of the shell 900 such that the shell is balanced. For example, four openings 910 may be provided. In other examples, also other numbers of openings may be provided. The complete shell 900 may be fabricated integrally. It may comprise thermoplastic polyurethane and/or polyamide. Shell 900 may be fabricated, e.g., by 3D-printing, injection molding, or thermoforming.

As a first example, the material commercially known as Vestamid LX9012 may be used to provide shell 900. This material provides an elastic modulus of approximately 0.55 GPa to 1.2 GPa, 0.65 GPa to 1.1 GPa, 0.9 GPa to 1.1 GPa, or 1 GPa. Using this material, shell 900 may comprise a uniform thickness of approximately 1 mm to 3 mm, or 1.5 mm to 2.5 mm, or 2 mm.

As a second example, a thermoplastic polyurethane may be used which provides an elastic modulus of approximately 10 MPa to 50 MPa, 10 MPa to 25 MPa, or 15 MPa, wherein the shell 900 may comprise a uniform thickness of approximately 4 mm to 12 mm, or 7 to 11 mm, or 10 mm.

As a third example, a thermoplastic polyurethane or polyamide may be used which provides an elastic modulus of approximately 0.1 MPa to 2 MPa, or 0.3 MPa to 1 MPa, or 0.5 MPa, wherein the shell comprises a uniform thickness of approximately 20 to 120 mm, 40 to 120 mm or 80 to 120 mm. In some cases, a full solid sphere may be provided although this may lead to increased weight of the ball.

Figure 9B:
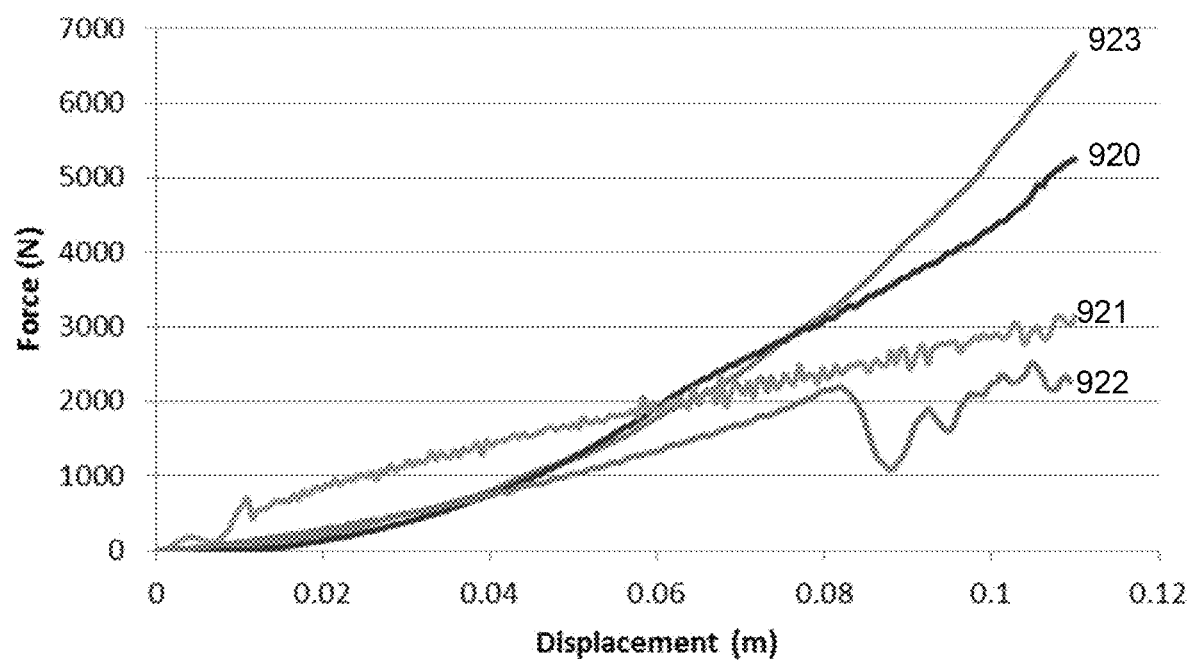

FIG. 9B shows the force (in Newton) that has to be applied to achieve a certain radial compression (in m) for various balls. Curve 920 relates to a standard soccer ball which is inflated to a pressure of 0.8 bar. The curves 921-923 relate to balls of the same size as the standard soccer ball but which—instead of an inflatable bladder—comprise a shell according to the present invention. Curve 921 relates to a shell according to the first example set forth above (thickness: 2 mm; elastic modulus: 1 GPa). Curve 922 relates to a shell according to the second example set forth above (thickness: 10 mm; elastic modulus: 15 MPa). Curve 923 relates to a full sphere according to the third example set forth above (Elastic modulus: 0.5 MPa). As can be seen, the force-displacement curve of a soccer ball with an inflatable bladder can be reasonably well reproduced by using shells according to the present invention, in particular for practically relevant displacements of less than 0.05 m.

By using a shell thickness of approximately 0.5 mm to 4 mm, 1.5 mm to 2.5 mm, or 2 mm, in addition, the weight limits required for a standard soccer ball may be respected easily by using standard materials.

Figure 10A:
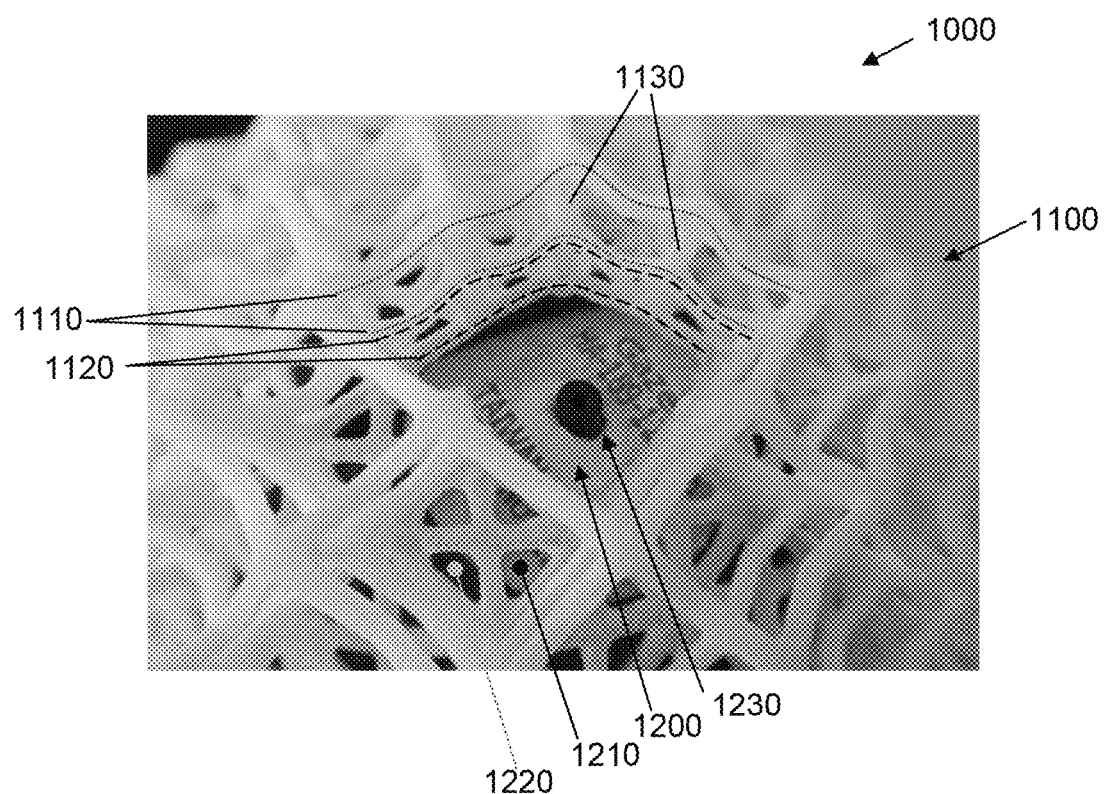
FIGS. 10A-C show a ball with a lattice structure and bladder according to some embodiments.
Figure 10B:
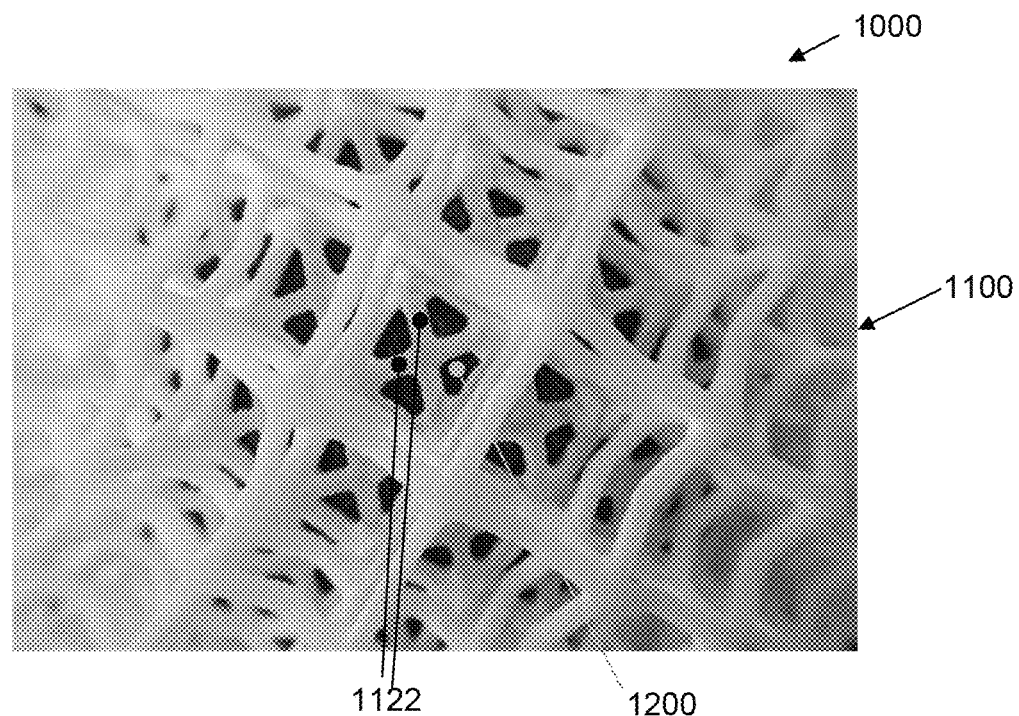
Figure 10C:
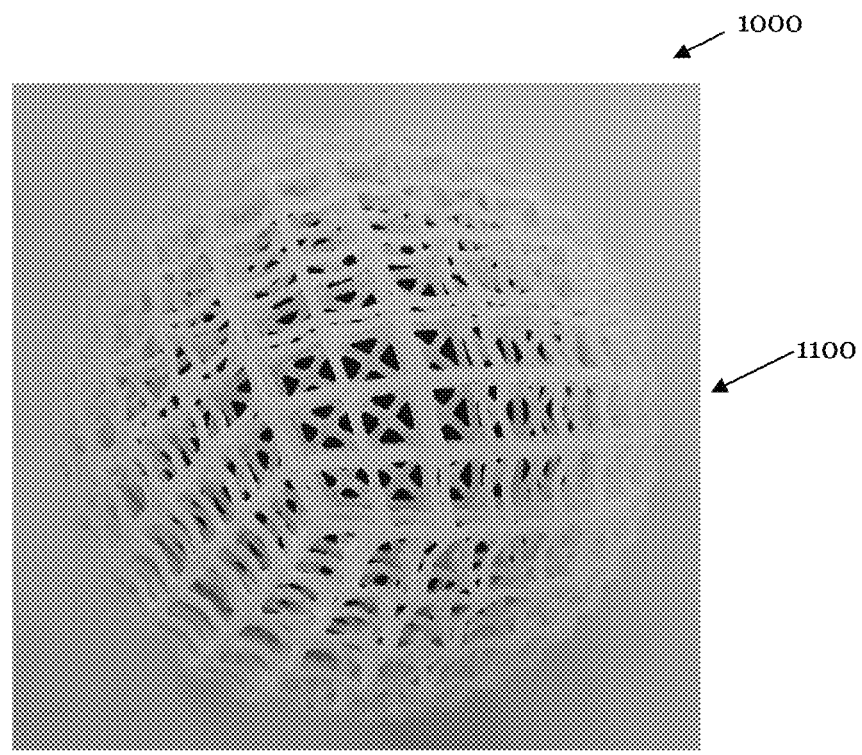

FIGS. 10A-C show various perspective views of a sports ball 1000, which comprises a lattice structure 1100 and a bladder 1200.

As can be seen from FIG. 10A, bladder 1200 comprises an airtight membrane 1210, which may be elastic. Membrane 1210 may be provided with any suitable material, e.g., latex, rubber, thermoplastic polyurethane. It may be advantageous to use a membrane comprising butyl rubber. On an outer surface of membrane 1210, one or more reinforcing elements 1220 may be provided. In the example of FIG. 10A, a relatively stiff fabric is provided to reinforce bladder 1200. Specifically, the fabric may be provided by attaching one or more fabric patches on the outer surface of membrane 1210. For example, 5 to 20, e.g., 18, fabric patches may be provided on membrane 1210, e.g., glued to membrane 1210.

Bladder 1200 also comprises a valve 1230, via which bladder 1200 may be inflated or deflated as needed. Valve 1230 may comprise rubber. Due to the presence of lattice structure 1100 around bladder 1200, lower pressure may be needed within bladder 1200, such that less leakage occurs via valve 1230. A region of membrane 1210 around valve 1230 may remain free from reinforcing element 1220, or from any reinforcing element. The size of this region may be adapted such as to balance the additional weight of valve 1230 by the "missing" weight of reinforcing element 1220 in that region. This may help to balance sports ball 1000 despite the presence of valve 1230. Bladder 1200 may not comprise any carcass.

As further shown in FIG. 10A, lattice structure 1100 comprises a plurality of lattice cells comprising radially extending elements 1130. The plurality of lattice cells may be arranged to form an inner lattice layer 1120 (indicated by dashed lines in FIG. 10A), and/or to from an outer lattice layer 1110 (indicated by dotted lines in FIG. 10A). Outer lattice layer 1110 encompasses inner lattice layer 1120 and both inner and outer lattice layers 1120 and 1110 encompass bladder 1200. That is, lattice structure 1100 comprises a central cavity within which bladder 1200 is arranged. Lattice structure 1100 may comprise an opening such that valve 1230 may be accessed more easily for re-inflating sports ball 1000. In particular, one or more vacancies may be provided in inner lattice layer 1100 and in outer lattice layer 1110 for that matter. For example, 1-9, 2-7, or 4 vacant lattice sites may be provided in each lattice layer.

Cells of outer lattice layer 1110 may comprise an approximately cubic shape provided by a set of beam-shaped elements, which are connected to each other at their ends. Cells of outer lattice layer 1110 may comprise beam-shaped elements, arranged to form the edges of a cube, e.g., 12 beam-shaped elements. Cells of inner lattice layer 1120 may also comprise an approximately cubic shape provided by a set of beam-shaped elements, which are connected to each other at their ends. Cells of inner lattice layer 1120 may also comprise beam-shaped elements, arranged to form the edges of a cube, e.g., 12 beam-shaped elements. In other examples, beam-shaped elements may be arranged to form the edges of other cell types, e.g., tetrahedrons, etc.

In other examples, a single lattice layer only or more than two lattice layers may also be provided. A lattice layer may generally be provided as a spheroid, e.g., spherical, shell.

As can best be seen from FIG. 10B, cells of inner lattice layer 1120 may, at the side facing the cavity of lattice structure 1100, respectively facing bladder 1200, comprise two additional beam-shaped elements 1122. These may be arranged such as to form diagonals of the approximately cubic face of the respective cell facing bladder 1200. All cells of inner lattice layer 1120 may comprise such two beam-shaped elements 1122. In other examples, only some cells of inner lattice layer 1120 and/or one or more cells of outer lattice layer 1110 may be provided with such two beam-shaped elements 1122 at their faces facing bladder 1200. In other examples, only one, or more than two beam-shaped elements may be provided at such faces. This particularly applies to examples in which other than cubic cell types are used for providing the cells. If for example, a cell comprises a hexagonal side face facing bladder 1200, a different number of additional beam-shaped elements 1122 may be provided for that cell. Generally, the additional beam-shaped elements 1122 may help to more uniformly cage bladder 1200, such that pressure peaks within bladder 1200 and/or undue deformation of bladder 1200 may be avoided. In addition, the mentioned reinforcing element(s) 1220 of bladder 1200 may contribute to this end. In some examples, one or more cells located adjacent to valve 1230 may not be provided with any additional reinforcing elements 1122 such that valve 1230 may be easily access via these cells. In such examples, lattice structure 1200 may not comprise an opening formed by vacancies in the lattice structure as described above with reference to FIG. 10A.

In some examples, the cells of lattice structure 1100 may additionally comprise one or more diagonal beam-shaped elements also at other faces of the cells. Additionally or alternatively, diagonal beam-shaped elements may—in addition to extending within one or more faces of a cell, e.g. as described with reference to beam-shaped elements 1122—also from one face of a cell to another face of that cell or even of another cell (e.g., diagonally within a cubic cell).

FIG. 10C shows a full view of sports ball 1000 comprising lattice structure 1100. Lattice structure 1100 is approximately spherical. In other examples, other shapes may be provided, depending on the desired shape of the sports ball.

Sports ball 1000 may be provided with additional elements, e.g., a surface layer, e.g., comprising a plurality of panels, as described. Sports ball 1000 may be adapted as a soccer ball. Lattice structure 1100, together with bladder 1200 may be adapted to balance sports ball 1000—despite the presence of valve 1230.

Lattice structure 1100 may generally comprise a polymer material, as described herein. In particular, polyether block amide may be useful for lattice structure 1100. Lattice structure 1100 may be manufactured by any of the methods as generally described herein, e.g., 3-D printing.

In addition, lattice structure 1100 may also comprise one or more features as explained for lattice structure 60 with reference to FIGS. 6A-D or it may be altered according to any such feature, e.g., as described with reference to FIG. 6D. For example, lattice cells of the outer layer may comprise an expanded material, preferably expanded thermoplastic polyurethane and/or expanded polyether block amide.

It is also conceivable to interchange the order of bladder 1200 and lattice structure 1100 in sports ball 1000. For example, bladder 1200—then being provided with a correspondingly larger diameter—could be arranged to encompass lattice structure 1100. Providing a bladder encompassing the lattice structure may be helpful to further increase the homogeneity of the bouncing properties at an outer surface of sports ball 1000.

What is claimed is:
1. A sports ball, comprising:
   a surface layer comprising a plurality of panels, wherein the plurality of panels comprises molded polymer panels or 3D-printed polymer panels; and
   a single-piece spherically-shaped homogeneous shell disposed below the surface layer,
   wherein the shell comprises a plurality of openings in the form of through holes extending through the shell, each opening having a dimension that is smaller than 1 cm,
   wherein the surface layer is directly attached to the single-piece spherically-shaped homogeneous shell and covers the plurality of openings, and
   wherein the sports ball is a soccer ball, a volleyball, or a basketball.
2. The sports ball according to claim 1, wherein the shell comprises a polymeric material.
3. The sports ball according to claim 1, wherein the shell is at least partly fabricated by one or more of 3-D printing, injection molding, and thermo-forming.
4. The sports ball according to claim 1, wherein the complete shell is integrally fabricated.
5. The sports ball according to claim 1, wherein the sports ball comprises an inflatable bladder.
6. The sports ball according to claim 5, wherein the inflatable bladder comprises at least one reinforcing element.
7. The sports ball according to claim 1, wherein the shell is configured such that the sports ball bounces at least 0.5 meters when dropped on a steel plate from a height of 2 meters.
8. The sports ball according to claim 1, wherein the shell is configured such that the sports ball deviates from sphericity by less than 5% after hitting a steel plate with a speed of 50 km/hr 2000 times.
9. The sports ball according to claim 1, wherein the shell comprises no more than four openings.
10. The sports ball according to claim 1, wherein the openings are evenly distributed over a surface of the shell.
11. The sports ball according to claim 2, wherein the polymeric material comprises an elastic modulus ranging from 0.55 GPa to 1.2 GPa.
12. The sports ball according to claim 11, wherein the shell comprises a thickness ranging from 1 mm to 3 mm.
13. The sports ball according to claim 2, wherein the polymeric material comprises an elastic modulus ranging from 10 MPa to 50 MPa.
14. The sports ball according to claim 13, wherein the shell comprises a thickness ranging from 4 mm to 12 mm.

15. The sports ball according to claim 2, wherein the polymeric material comprises an elastic modulus ranging from 0.1 MPa to 2 MPa.

16. The sports ball according to claim 15, wherein the shell comprises a thickness ranging from 20 mm to 120 mm.

17. A non-inflatable sports ball, comprising:
- a surface layer comprising a plurality of panels; and
- a single-piece spherically-shaped homogeneous shell disposed below the surface layer,
- wherein the shell comprises a plurality of openings in the form of through holes extending through the shell, each opening having a dimension that is smaller than 1 cm,
- wherein the shell comprises a polymeric material comprising:
  - an elastic modulus ranging from 10 MPa to 50 MPa and a thickness ranging from 4 mm to 12 mm; or
  - an elastic modulus ranging from 0.1 MPa to 2 MPa and a thickness ranging from 20 mm to 120 mm,
- wherein the surface layer covers the plurality of openings,
- wherein the sports ball is a soccer ball, a volleyball, or a basketball,
- wherein the sports ball does not comprise an inflatable bladder, and
- wherein a radial deformation of the sports ball ranges from 4 cm to 6 cm when a 1000 N force is applied thereto.

* * * * *